Nov. 10, 1931.                 D. DAVID                  1,831,097
                                MOTOR
                          Filed Sept. 18, 1929
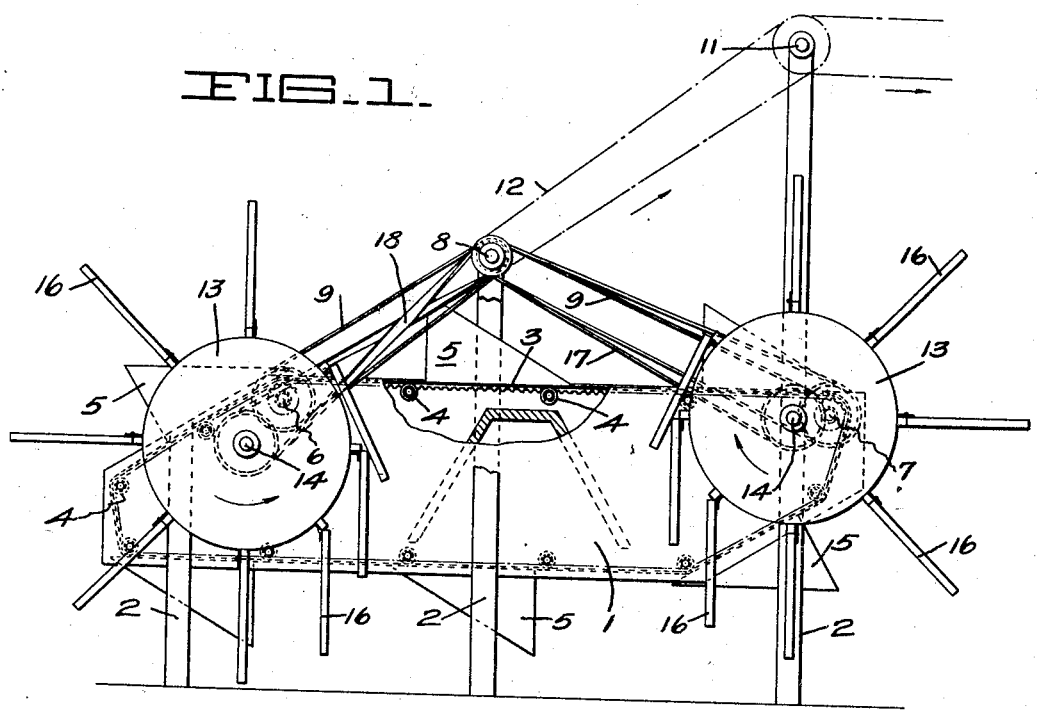
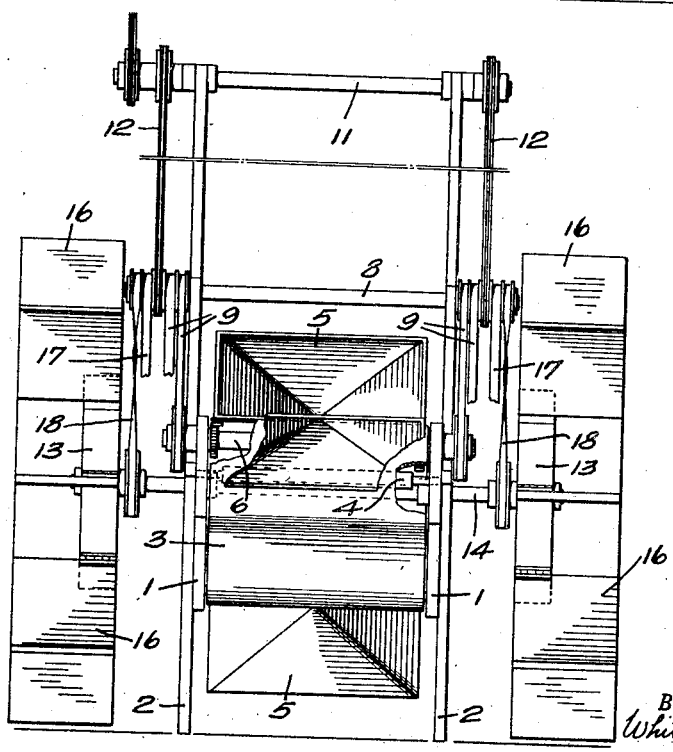
INVENTOR:
Desiderius David
BY
White, Prost, Flehr & Lothrop
ATTORNEYS.

Patented Nov. 10, 1931

1,831,097

UNITED STATES PATENT OFFICE

DESIDERIUS DAVID, OF SAN FRANCISCO, CALIFORNIA

MOTOR

Application filed September 18, 1929. Serial No. 393,412.

My invention relates to motors for receiving and transmitting power and particularly to motors for receiving and conveying power derived from the motion of water.

It is an object of my invention to provide a motor to employ the power latent in the ordinary movement of the waves of the ocean.

It is a further object of my invention to provide a motor to employ the potential power of the adverse motion of the ocean waves.

It is a still further object of my invention to provide a motor which is of simple and cheap construction and which is of sufficient rigidity to withstand the force of ocean waves.

The foregoing and other objects together with some of its advantageous features, will be set forth in the following description where I have described the preferred form of my motor. My device is not to be limited to the form shown, as my invention, as defined in the appended claims, may be embodied in a plurality of forms.

Fig. 1 is a side elevation of my motor.

Fig. 2 is a front elevation of my motor.

My invention preferably comprises an endless belt on which buckets are mounted for receiving incoming and receding waves of the ocean whereby the belt is caused to rotate. It further comprises a plurality of feathering wheels on which paddles are pivotally mounted for receiving the incoming and receding waves whereby the wheels are caused to rotate, a rotatable shaft, and a series of pulleys and belts for transmitting the power derived from the motion of the waves from the belt and wheels to the shaft.

In its preferred form, my motor comprises a trough 1, mounted on a support 2, of sufficient s rength to withstand the force of ocean waves. In order that the power derived from the ocean waves may be received, I preferably mount an endless belt 3 upon rollers 4 journaled in the trough 1, to which belt I conveniently secure buckets 5 adapted to receive the incoming and receding waves of the ocean whereby the endless belt is caused to rotate.

When the buckets 5 are on the upper run of the belt, they are adapted to receive the incoming waves and when they are on the lower run of the belt, they are adapted to receive the receding waves, so that a continuous rotation in one direction is given to the belt. I preferably construct the buckets 5 of such shape that any adverse effects of the waves which tend to prevent uni-directional motion of the belt are avoided.

To transmit the power received by the buckets 5 I conveniently gear two rotatable shafts 6 and 7 to the endless belt 3 and connect the ends of each of these shafts to a third rotatable shaft 8, journaled in the support 2, by suitable belting 9. To connect the shaft 8 to an ultimate power receiving shaft 11, I provide similar belting 12.

To augment that part of my device described above, I provide a plurality of feathering wheels 13, mounted upon rotatable shaft 14, journaled in the support 2. On the wheels 13, are pivotally mounted paddles 16, adapted to receive the incoming and receding waves.

In order to negative the possibly disadvantageous effect of the waves I conveniently provide paddles that are collapsible. The incoming waves impinge upon the paddles, when rigid, upon at least one of the feathering wheels 13, and cause it to rotate and, as it rotates, the paddles collapse so that the adverse motion of the waves will not affect the rotation of the wheels. The receding waves impinge upon the paddles upon at least one or the other of the wheels and, as it rotates, the paddles collapse so that the adverse motion of the waves will not affect the rotation of that wheel.

In order to take advantage of the adverse motion of the waves I pivotally mount the paddles 16 upon the wheels so that the paddles on at least one of the wheels are adapted to receive the adverse motion of the waves, whereby the wheel is caused to rotate in a direction counter to the direction of rotation of the endless belt 3, and, as the wheel rotates, the paddles collapse so that the ordinary motion of the waves will not impinge upon any of the paddles on that wheel, and cause it to stop or rotate counter to the direction of rotation given to it by the adverse motion of the waves.

To convey the power received by the feathering wheels 13, to the ultimate power receiving shaft 11, I conveniently provide suitable belting 17 and 18 connecting the rotatable shaft 14 to the rotatable shaft 8, and the belting 12 to connect the shaft 8 to the shaft 11. The belting 18, is twisted to rectify the direction of rotation of at least one of the feathering wheels.

I claim:

1. A motor adapted to be driven by ocean waves comprising an endless belt, buckets on said belt adapted to receive the incoming and receding waves of the ocean, a plurality of feathering wheels, paddles on said wheels adapted to receive said incoming and receding waves, a rotatable shaft, and separate means connecting said shaft, to said belt, and said shaft to said wheels whereby said shaft is rotated either by the motion of said belt or the motion of said wheels.

2. A motor adapted to be driven by ocean waves comprising an endless belt, buckets on said belt adapted to receive the incoming and receding waves of the ocean whereby said belt is caused to rotate, a plurality of feathering wheels, collapsible paddles pivoted on said wheels, said paddles adapted to receive said incoming and receding waves whereby at least one of said wheels is caused to rotate in one direction and at least another of said wheels is caused to rotate in the opposite direction, a rotatable shaft, means inter-connecting said shaft, said belt, and said wheels whereby said shaft is caused to rotate.

3. A motor adapted to be driven by ocean waves, comprising a trough mounted on a support, an endless belt secured to said trough, buckets mounted on said belt, said buckets adapted to receive said incoming waves when on the upper run of said belt and adapted to receive the receding waves when on the lower run of said belt whereby said belt is caused to rotate, a plurality of feathering wheels mounted on said support, collapsible paddles pivoted on said wheels; the paddles on at least one of said wheels adapted to receive the incoming waves whereby said wheel is caused to rotate and the paddles on at least one of the other of said wheels adapted to receive the adverse motion of said waves whereby said wheel is caused to rotate in a direction opposite to said first-named wheel, a rotatable shaft on said support, means inter-connecting said shaft, said belt, and said wheels for rotating said shaft when said wheels and said belt are caused to rotate.

4. A motor adapted to be driven by ocean waves comprising a support, an endless conveyor on said support, buckets on said conveyor; said buckets being disposed so as to receive the incoming and receding ocean waves and being of such shape so as to divert the adverse motion of said incoming and receding waves, a plurality of feathering wheels rotatably mounted on said support, and paddles on said wheels, said paddles being adapted to receive the ordinary and adverse motion of said incoming and receding waves whereby rotation in one direction is imparted to at least one of said wheels and rotation in an opposite direction is imparted to another of said wheels.

In testimony whereof, I have hereunto set my hand.

DESIDERIUS DAVID.